(12) United States Patent
Scheidema

(10) Patent No.: US 10,337,084 B2
(45) Date of Patent: Jul. 2, 2019

(54) METHOD AND CARRIER FOR TRANSPORTING REDUCTANT SUCH AS COKE INTO A METALLURGICAL FURNACE AND PRODUCTION METHOD OF THE CARRIER

(71) Applicant: OUTOTEC (FINLAND) OY, Espoo (FI)

(72) Inventor: Madeleine Scheidema, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 243 days.

(21) Appl. No.: 15/129,170

(22) PCT Filed: Mar. 31, 2015

(86) PCT No.: PCT/FI2015/050227
§ 371 (c)(1),
(2) Date: Sep. 26, 2016

(87) PCT Pub. No.: WO2015/150635
PCT Pub. Date: Oct. 8, 2015

(65) Prior Publication Data
US 2018/0179613 A1    Jun. 28, 2018

(30) Foreign Application Priority Data

Mar. 31, 2014    (FI) .................................... 20145300

(51) Int. Cl.
*B09B 3/00*    (2006.01)
*C22B 1/14*    (2006.01)
(Continued)

(52) U.S. Cl.
CPC .......... *C22B 15/0054* (2013.01); *B09B 3/005* (2013.01); *C22B 1/14* (2013.01);
(Continued)

(58) Field of Classification Search
CPC ........... C22B 1/14; C22B 1/245; C22B 1/248; C22B 15/0026; C22B 15/0056; C22B 7/0001; C22C 1/02; B09B 3/005
See application file for complete search history.

(56) References Cited

U.S. PATENT DOCUMENTS 4,504,309 A * 3/1985 Mackey .................... C22B 5/02
                                                         75/627
4,701,217 A    10/1987 Warner
(Continued)

FOREIGN PATENT DOCUMENTS

CL    2011001446 A1    8/2011
CN    1250754 C    4/2006
(Continued)

OTHER PUBLICATIONS

Elert, Glenn. "Density of Steel." The Physics Factbook. Retrieved Apr. 23, 2009. Dowloaded Jul. 19, 2018. Four pages. (Year: 2009).*
(Continued)

*Primary Examiner* — Tima M McGuthry-Banks
(74) *Attorney, Agent, or Firm* — Buchanan, Ingersoll & Rooney PC

(57) ABSTRACT

Provided is a method for transporting reductant such as coke into a metallurgical furnace containing a bottom layer containing molten metal and a top layer on top of the bottom layer containing molten metal. The method comprises a first providing step for providing reductant, a second providing step for providing metal, a forming step for forming carriers containing reductant and metal of reductant provided in the first providing step and metal provided in the second providing step, and a feeding step for feeding carriers formed in the forming step into the metallurgical furnace. Also provided is a carrier and a production method for producing carriers.

11 Claims, 1 Drawing Sheet

Figure 1:
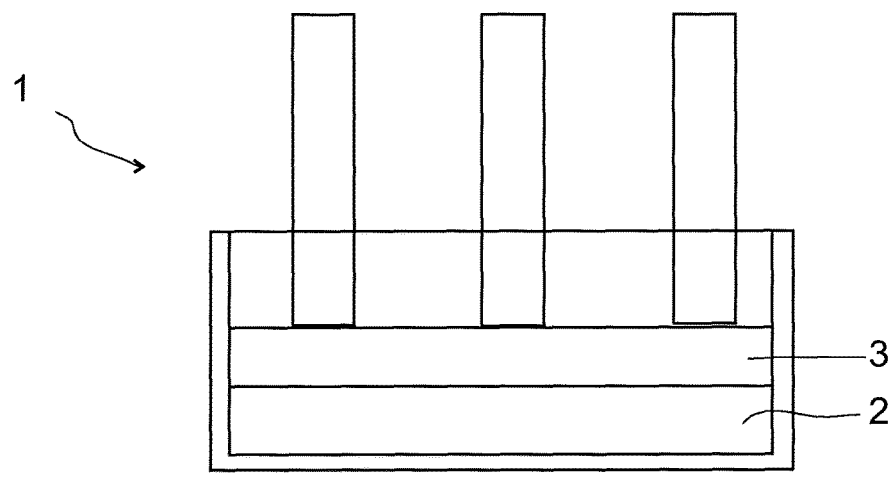

(51) Int. Cl.
   *C22B 1/245*    (2006.01)
   *C22B 1/248*    (2006.01)
   *C22B 15/00*    (2006.01)
   *C22B 7/04*     (2006.01)

(52) U.S. Cl.
   CPC .............. *C22B 1/245* (2013.01); *C22B 1/248* (2013.01); *C22B 7/04* (2013.01); *C22B 15/0026* (2013.01); *C22B 15/0039* (2013.01); *Y02P 10/212* (2015.11)

(56) References Cited

U.S. PATENT DOCUMENTS

| | | | | |
|---|---|---|---|---|
| 5,094,432 | A | * | 3/1992 | Marguier ................. C22C 21/04 266/216 |
| 5,916,827 | A | * | 6/1999 | Vayda ........................ C10L 5/10 44/580 |
| 5,993,508 | A | * | 11/1999 | Stephan ..................... C21B 3/02 148/513 |
| 6,096,110 | A | | 8/2000 | Mäntymäki |
| 6,277,168 | B1 | | 8/2001 | Huang et al. |
| 6,391,086 | B1 | | 5/2002 | Contrucci et al. |
| 6,478,847 | B1 | * | 11/2002 | Jamison .............. C22B 15/0056 75/386 |
| 8,043,402 | B2 | | 10/2011 | Reichel et al. |
| 2003/0233912 | A1 | | 12/2003 | Sugitatsu et al. |
| 2009/0211398 | A1 | | 8/2009 | Kunze et al. |
| 2009/0255375 | A1 | | 10/2009 | Reichel et al. |
| 2011/0197708 | A1 | | 8/2011 | Reichel et al. |
| 2012/0167715 | A1 | * | 7/2012 | Thomy ................... C22B 1/243 75/10.14 |
| 2013/0269481 | A1 | | 10/2013 | Zhou et al. |
| 2014/0352496 | A1 | * | 12/2014 | Reichel ................... C10L 5/361 75/317 |
| 2015/0143951 | A1 | | 5/2015 | Ahokainen et al. |

FOREIGN PATENT DOCUMENTS

| | | | |
|---|---|---|---|
| CN | 101591718 | A | 12/2009 |
| CN | 101613801 | A | 12/2009 |
| CN | 101956076 | A | 1/2011 |
| CN | 102719676 | A | 10/2012 |
| CN | 103451346 | A | 12/2013 |
| CN | 103667712 | A | 3/2014 |
| DE | 195 41 673 | A1 | 8/1996 |
| EP | 1 375 686 | A1 | 1/2004 |
| EP | 1409754 | B1 | 8/2012 |
| GB | 2091233 | A * | 7/1982 |
| JP | 2002105548 | A * | 4/2002 |
| JP | 2004-526864 | A | 9/2004 |
| RU | 2418863 | C2 | 5/2011 |
| WO | WO 2009/077651 | A1 | 6/2009 |
| WO | WO 2013/186440 | A1 | 12/2013 |

OTHER PUBLICATIONS

JP 2002105548 machine translation of the description. (Year: 2002).*
Dippenaar, R. "Industrial uses of slag (the use and re-use of iron and steelmaking slags)." Ironmaking & Steelmaking; 32, 1; ProQuest p. 35-46. February. (Year: 2005).*
International Search Report (PCT/ISA/210) dated Jul. 6, 2015, by the European Patent Office as the International Searching Authority for International Application No. PCT/FI2015/050227.
Written Opinion (PCT/ISA/237) dated Jul. 6, 2015, by the European Patent Office as the International Searching Authority for International Application No. PCT/FI2015/050227.
Notification of Transmittal of the International Preliminary Report on Patentability (Form PCT/IPEA/416) and International Preliminary Report on Patentability (Form PCT/IPEA/409) dated Apr. 1, 2016, in the corresponding International Application No. PCT/FI2015/050227. (11 pages).
Finnish Search Report dated Oct. 30, 2014, issued by the Finnish Patent Office in the corresponding Finnish Patent Application No. 20145300. (2 pages).
Office Action issued by the State Intellectual Property Office of the People's Republic of China, in corresponding Chinese Patent Application No. 201580016172.0 dated Jun. 1, 2017 (12 pages).
Office Action issued by the Eurasian Patent Office in corresponding Eurasian Patent Application No. 201691639/31 dated May 31, 2018 (4 pages including partial English translation).
Office Action issued by the Korean Intellectual Property Office, in corresponding Korean Patent Application No. 10-2016-7026843 dated Jun. 23, 2017 (8 pages including partial English translation).
Office Action issued in corresponding Chilean Patent Application No. 201602424 by the Chilean Patent Office dated Jan. 23, 2018 (8 pages).

* cited by examiner

METHOD AND CARRIER FOR TRANSPORTING REDUCTANT SUCH AS COKE INTO A METALLURGICAL FURNACE AND PRODUCTION METHOD OF THE CARRIER

FIELD OF THE INVENTION

The invention relates to a method for transporting reductant such as coke into a metallurgical furnace containing a bottom layer containing molten metal and a top layer on top of the bottom layer containing molten metal.

The invention also relates to a carrier for transporting reductant such as coke into a metallurgical furnace containing a bottom layer containing molten metal and a top layer on top of the bottom layer containing molten metal.

The invention relates also to a production method for producing reductant carriers.

The field of invention is especially reduction processes which are performed in slag cleaning electrical furnaces into which slag from suspension smelting furnaces are fed in order to, by means of the reduction process, recover metal such as copper or nickel from the slag that is fed into the slag cleaning electrical furnaces. In connection with this reduction process, a bottom layer containing metal is formed on the bottom of the slag cleaning electrical furnace and a top layer is formed on top of the top layer in the slag cleaning electrical furnace, and the purpose of the reduction process is to have metal to migrate (i.e. to sink) from the top layer in the slag cleaning electrical furnace to the bottom layer in the slag cleaning electrical furnace. The invention is however not limited to reduction processes, which are performed in slag cleaning electrical furnaces nor to reduction processes, which are performed after suspension smelting process to clean slag created in the suspension smelting process.

Coke is commonly used as a reductant in electric slag cleaning furnaces, which are used for recovering metal from slag originating from suspension smelting furnaces. The utilization of coke is however low, as the coke floats on top of the slag due to its low density. The reduction with coke can be improved by mixing, which results in better contact between coke and molten slag.

OBJECTIVE OF THE INVENTION

The object of the invention is to provide a method and a carrier for transporting reductant such as coke into a metallurgical furnace, which method and carrier provides for better contact between reductant such as coke and molten slag.

SHORT DESCRIPTION OF THE INVENTION

The invention is based on forming and on using carriers containing reductant such as coke and metal for transporting reductant such as coke into a metallurgical furnace containing a bottom layer containing molten metal and a top layer on top of the bottom layer containing molten metal.

The carriers will not just stay on the surface of the slag, as reductant for example in the form of coke alone does, but the carriers will sink into the slag. This is because the density the carriers are higher than the density of the reductant alone because of the metal in the carriers. The reductant in the carriers will thus not only react on the top layer/bottom layer interface i.e. at the surface of the top layer, but the carriers will be totally surrounded by slag. This will make the reduction reaction much more efficient.

As the carriers will disintegrate over time, the coke will move to the top of the slag, where it further acts as normal coke. How long this will take, depends mainly on the size of the carriers, but additionally also on how fast the metal in the carriers will melt.

The metal from the carriers will sink into the bottom layer of the metallurgical furnace and will contribute to the matte or metal phase.

LIST OF FIGURES

Figure 2:
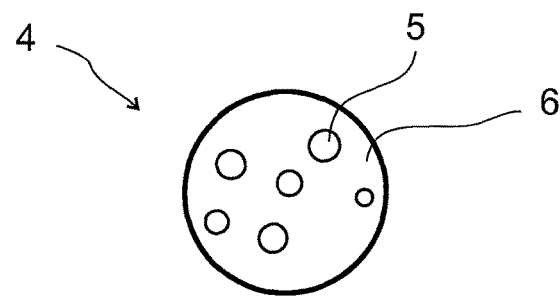

In the following the method and the carrier will be described in greater detail by referring to the figures, of which FIG. 1 shows a metallurgical furnace in the form of a slag cleaning electrical furnace containing a top layer and a bottom layer, and FIG. 2 shows a carrier according to one embodiment.

DETAILED DESCRIPTION OF THE INVENTION

The invention relates to a method for transporting reductant such as coke into a metallurgical furnace 1 such as a slag cleaning electric furnace containing a bottom layer 2 containing molten metal such as copper or nickel and a top layer 3 on top of the bottom layer 2 containing molten metal. The top layer 3 may contain slag.

The invention relates also to a carrier 4 for transporting reductant 5 such as coke into a metallurgical furnace 1 containing a bottom layer 2 containing molten metal such as copper or nickel and a top layer 3 on top of the bottom layer 2 containing molten metal such as copper or nickel.

The metallurgical furnace 1 may be in the form of a slag cleaning electric furnace, which is used for recovering metal from slag originating from a suspension smelting furnace.

First the method and some preferred embodiments and variants of the method will be described in greater detail.

The method comprises a first providing step for providing reductant 5 and a second providing step for providing metal 6 such as copper or nickel.

The method comprises a forming step for forming carriers 4 containing reductant 5 and metal 6 of reductant 5 provided in the first providing step and metal 6 provided in the second providing step.

The method comprises a feeding step for feeding carriers 4 formed in the forming step into the metallurgical furnace 1.

The method comprises preferably, but not necessarily, forming carriers 4 containing reductant 5 and metal 6 in the forming step having at least the density of the top layer 3. In this case the method comprises preferably, but not necessarily, forming carriers 4 containing reductant 5 and metal 6 in the forming step having a density that is lower than the density of the bottom layer 2 containing molten metal.

The method comprises preferably, but not necessarily, forming carriers 4 containing reductant 5 and metal 6 in the forming step having a density of 90 to 200%, preferably 110 to 190%, more preferably 125 to 150%, of the density of the top layer 3. The forming step of the method comprises preferably, but not necessarily, pressing reductant 5 and metal 6 in the forming step by means of a press (not shown in the figures) such as a hydraulic press to form the carriers 4.

The method may comprise providing metal 6 in the second providing step in the form of copper scrap such as rejected cast anodes, spent cast anodes, and secondary copper. This provided that the bottom layer 2 containing molten metal contains copper. In such case the production method may comprise a chopping step for chopping the copper scrap, which chopping step is performed prior the forming step.

The method may comprise forming in the forming step carriers 4 containing reductant 5 and metal 6 in the form of copper so that the carriers 4 containing in mass percentages between 10 and 70% copper, preferably between 20 and 60% copper, more preferable between 25 and 50% copper, the rest being reductant 5 and optionally binder such as water and possible impurities originating from the reductant 5 provided in the first providing step and/or originating from the copper provided in the second provided step. The forming step may optionally include a drying step for strengthening of the carrier.

The method may comprise forming in the forming step carriers 4 containing reductant 5 and metal 6 having an average grain size between 10 and 200 mm.

Next the carrier 4 and some embodiments and variants thereof will be described in greater detail.

The carrier 4 contains reductant 5 and metal 6 such as copper or nickel.

The density of the carrier 4 is preferably between 3 and 7 g/cm$^3$.

The carrier 4 contains preferably, but not necessarily, reductant 5 and metal 6 in the form of at least copper so that the carrier contains in mass percentages between 10 and 70% copper, preferably between 20 and 60% copper, more preferable between 25 and 50% copper, the rest being reductant 5 and optionally binder such as water and possible impurities originating from the reductant 5 and/or originating from the copper.

The carrier 4 may have an average grain size between 10 and 200 mm.

The invention relates also to a production method for producing carriers 4 as described earlier. The production method comprises a first providing step for providing reductant 5 and a second providing step for providing metal 6 such as copper or nickel. The production method comprises additionally a forming step for forming carriers 4 containing reductant 5 and metal 6 of reductant 5 provided in the first providing step and metal 6 provided in the second providing step.

The forming step of the production method comprises preferably, but not necessarily, pressing reductant 5 and metal 6 in the forming step by means of a press (not shown in the figures) such as a hydraulic press to form the carriers 4.

The production method may comprise providing metal 6 in the second providing step metal 6 in the form of copper scrap such as rejected cast anodes, spent cast anodes, and secondary copper. In such case, the production method may comprise a chopping step for chopping the copper scrap, which chopping step is performed prior the forming step.

The production method may comprise a drying step for strengthening of the carrier.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for transporting a reductant into a metallurgical furnace containing a bottom layer containing molten metal and a top layer on top of the bottom layer,
wherein the method comprises:
providing a reductant,
providing a metal,
forming carriers containing the reductant and the metal, and
feeding the carriers containing the reductant and the metal into the metallurgical furnace,
wherein the carriers have a density of 110 to 190% of the density of the top layer in the metallurgical furnace and a density that is lower than the density of the bottom layer containing molten metal in the metallurgical furnace, and wherein the carriers contain in mass percentage between 10 and 70% copper, the rest being reductant and optionally binder and impurities originating from the reductant and/or originating from the copper.

2. The method according to claim 1, wherein the metal in the carriers is copper scrap.

3. The method according to claim 2, wherein the copper scrap is selected from the group consisting of rejected cast anodes, spent cast anodes, and secondary copper.

4. The method according to claim 1, wherein the carriers contain between 20 and 60% copper.

5. The method according to claim 1, wherein the carriers have an average grain size between 10 and 200 mm.

6. The method according to claim 1, wherein the carriers are formed by means of a press.

7. The method according to claim 6, wherein the pressing is by a hydraulic press.

8. The method according to claim 1, wherein the method further comprises drying the carriers.

9. The method according to claim 1, wherein the carriers contain between 25 and 50% copper.

10. The method according to claim 1, wherein the carriers have a density of 125 to 150% of the density of the top layer in the metallurgical furnace.

11. The method according to claim 1, wherein the reductant is coke.

* * * * *